Dec. 22, 1953  H. A. ROHDIN  2,663,353
HEAT SEALER

Filed May 1, 1952  3 Sheets-Sheet 1

INVENTOR
HOWARD A. ROHDIN

BY
ATTORNEY

Dec. 22, 1953     H. A. ROHDIN     2,663,353
HEAT SEALER
Filed May 1, 1952     3 Sheets-Sheet 2
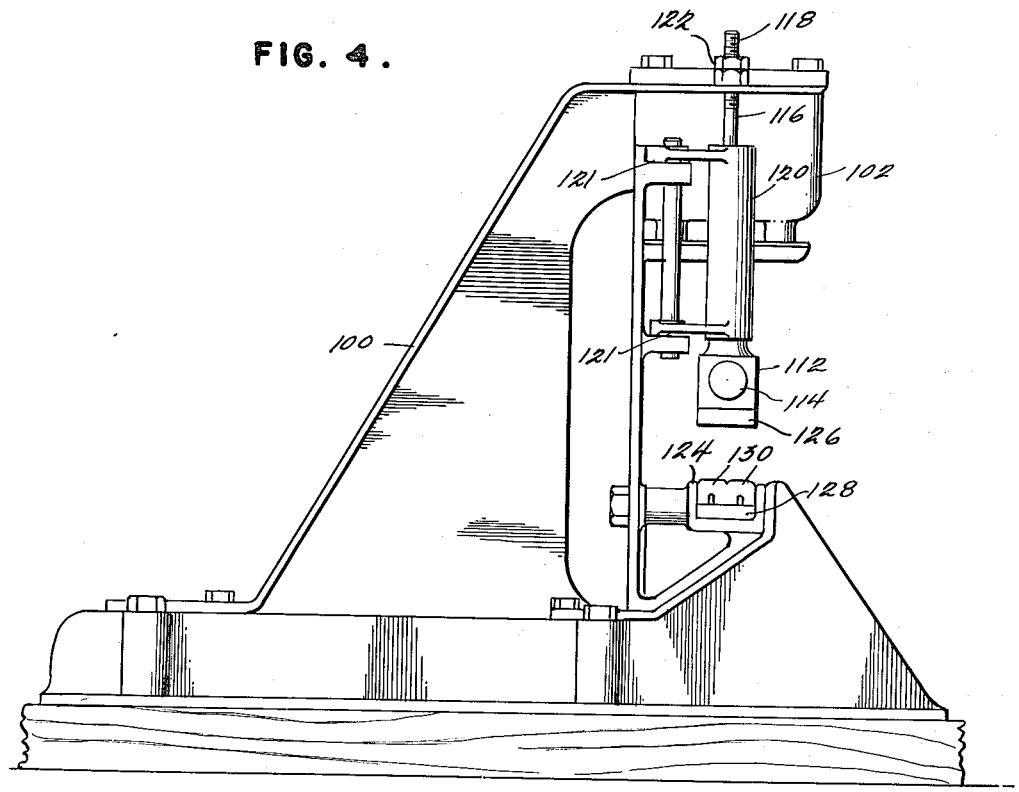
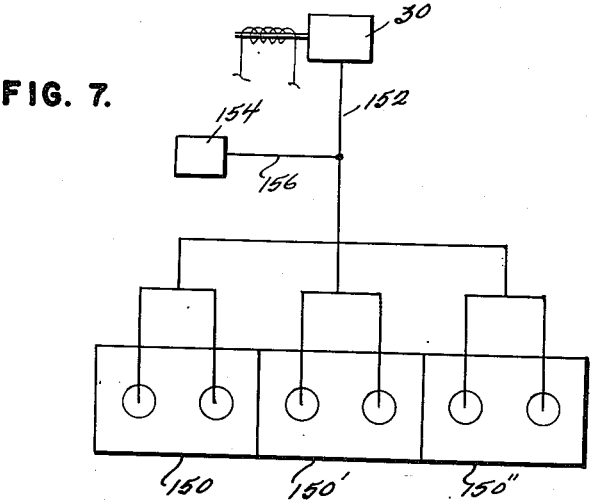
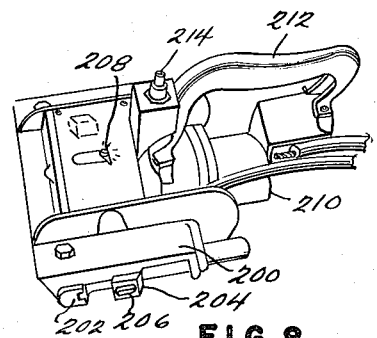
INVENTOR
HOWARD A. ROHDIN
BY
ATTORNEY Dec. 22, 1953       H. A. ROHDIN        2,663,353
                     HEAT SEALER
Filed May 1, 1952                    3 Sheets-Sheet 3
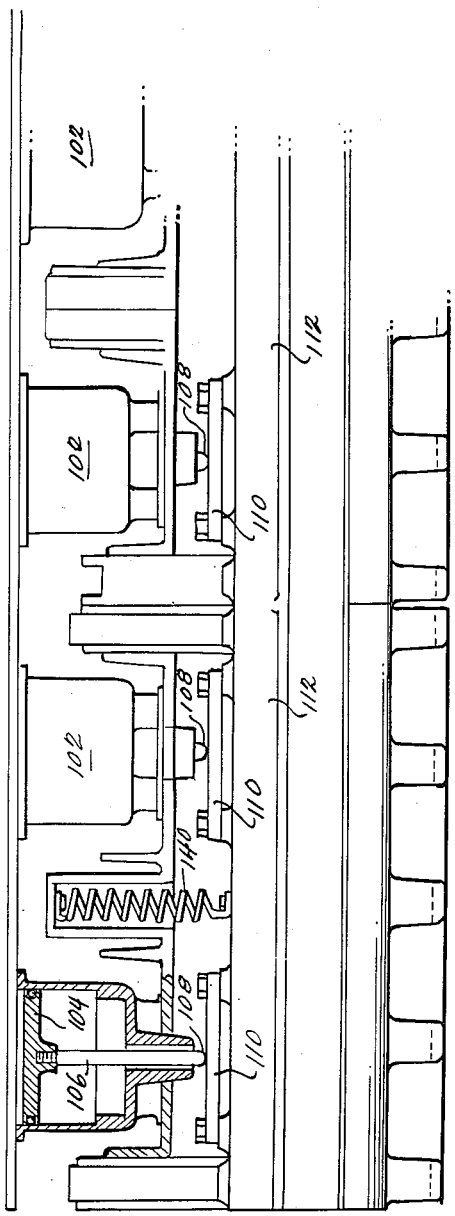
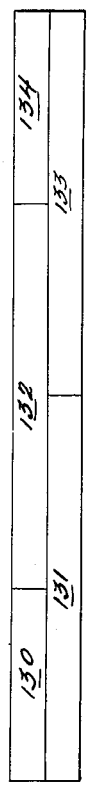
INVENTOR
HOWARD A. ROHDIN
BY
                    ATTORNEY Patented Dec. 22, 1953

2,663,353

UNITED STATES PATENT OFFICE 2,663,353

HEAT SEALER

Howard A. Rohdin, Glen Ridge, N. J.

Application May 1, 1952, Serial No. 285,490

7 Claims. (Cl. 154—42)

It is an object of this invention to provide a heat sealing machine in which the elements of time, temperature and pressure are independently adjustable and in which any given combination of time, temperature and pressure can be invariably reproduced.

It is a further object of this invention to provide a heat sealing machine as aforesaid in which the sealing jaws optionally may be handled as portable or may be operated from a fixed base.

It is a further object of this invention to provide in a heat sealing machine for adjustment of the length of the heat sealing jaws.

The above and other objects will be made clear from the following detailed description taken in connection with the annexed drawings, in which:

Figure 4 is a side elevation of the improved sealing head;

Figure 5 is a front elevation partially in section of the device shown in Figure 4;

Figure 6 is a plan view of the lower sealing jaw showing the arrangement of resilient backing members;

Figure 7 is a diagram of a pneumatic arrangement used in the case of extremely long jaws; and Figure 8 is a perspective view illustrating the most portable type of unit.

It is a fundamental of the heat sealing art that for each type of material to be sealed and for a given caliper in any particular type there is an optimum combination of time, temperature and pressure and since the combination varies with the different materials and calipers all three elements should be independently variable. Once an optimum combination is determined it is equally important that the heat sealing machine should be capable of infallibly reproducing that combination in consecutive operations. The present invention precisely meets these requirements.

Figure 1:
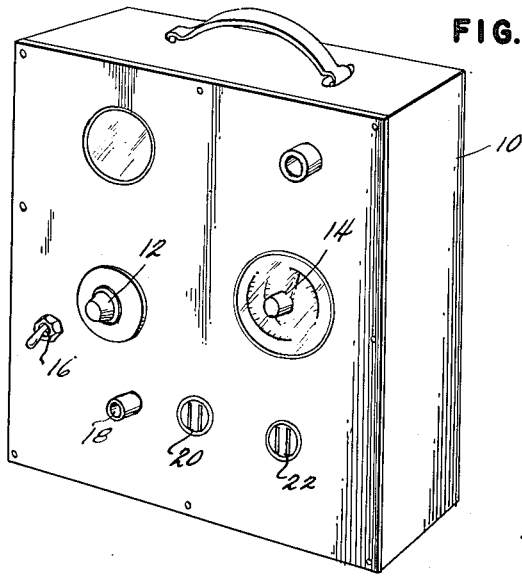
Figure 1 is a perspective view illustrating the control cabinet used with this invention.

Referring now to Figure 1 there is shown a control box 10 having a calibrated knob 12 by which pressure may be set, a calibrated knob 14 by which time may be determined, an off-on switch 16, a hose connection plug 18 and a pair of electrical plugs 20 and 22.

Figure 2:
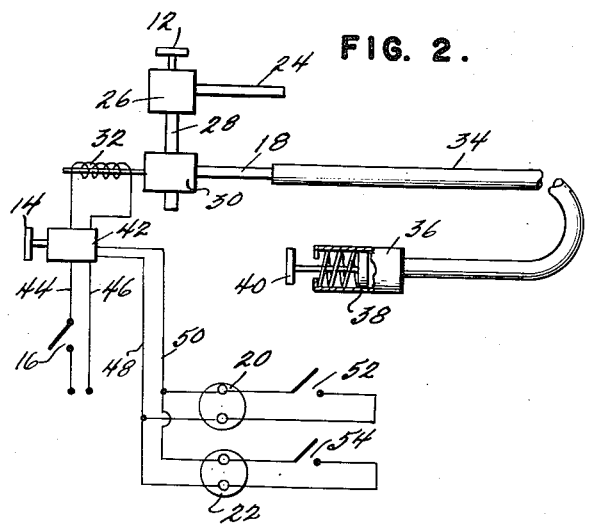
Figure 2 is a diagrammatic view illustrating the combination of elements for the control of the sealing cycle.

Referring now to Figure 2 a line 24 connects a throttle valve 26 to a source of air pressure. The valve 26 is controlled by the knob 12 which is calibrated to read directly in pounds per sq. in. pressure in the sealing jaws. A line 28 connects the valve 26 to a conventional 4-way valve 30 which is operated by a solenoid 32. The valve is conventionally biased to closed position by a spring. When the solenoid 32 is energized the valve 30 opens and connects the pressure to the outlet plug 18 which, by a flexible hose 34, is connected to a cylinder 36 in which is a piston 38 connected to a sealing jaw 40.

The solenoid 32 is connected to a timer 42 which may be set by means of the knob 14. Lines 44 and 46 connect the timer to a source of power and the line 44 contains the off-on switch 16.

A pair of lines 48 and 50 are connected to the timer 42 and contain in parallel the plugs 20 and 22. These plugs may be connected to switches 52 and 54. The closing of either switch will energize the timer which in turn energizes the solenoid 32 and maintains it energized for the period of time set on the timer by the knob 14. At the expiration of the pre-set time the timer de-energizes the solenoid 32 and the device is ready for another operation. With this arrangement it does not matter whether either the switch 52 or 54 is opened before the completion of the cycle nor does it matter if either or both of the switches 52 and 54 be held closed since even if these switches are held closed the timer at the end of the predetermined interval will de-energize the solenoid 32 and it would be necessary to open the switches 52 and 54 and re-close them to start another cycle.

Such timers are conventional and are available from numerous sources on the open market. For this reason it is not considered essential in this disclosure to go into the particular workings of the timer itself.

The reason for providing parallel connections is that when it is desired to use the sealer as a portable unit the switch 52 will be a trigger-type switch built into the handle of the unit but if it is desired to clamp the same unit to a support and use it as a fixed unit, then it may be desirable to provide a second switch for use as, say, a treadle operation leaving both hands of the operator free.

Figure 3:
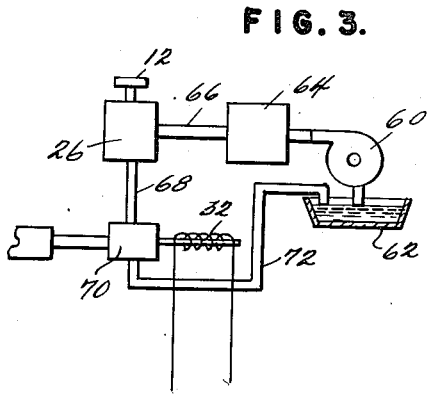
Figure 3 is a diagram similar to Figure 2 illustrating a somewhat different arrangement.

In some plants there may not be air pressure available, in which case the arrangement of Figure 3 is to be preferred. In this figure a pump 60 draws hydraulic fluid from a vat 62 and delivers it to a pressure accumulator 64. From the accumulator 64 a line 66 runs to the pressure adjustment valve 26 controlled by the knob 12 thence through a line 68 to a 4-way valve 70 controlled by the solenoid 32 and having a line 72 for returning fluid to the sump 62.

The use of the accumulator 64 permits minimizing the size and power of the pump. Fluid is actually needed only in the period in which the piston is being advanced which is relatively a small part of the total cycle. The accumulator gives the pump most of the cycle in which to restore pressure.

The actual sealing unit will now be described and reference is made to Figures 4, 5 and 6.

For bench operation there is provided a C-shaped frame 100 in which are mounted a pair of cylinders 102 each containing a piston 104. Each piston has a piston rod 106, the free end 108 of which is hemispherical to have rocking contact with a bridge member 110 which bears on a movable sealing bar 112. The bar 112 contains a heating element 114, the temperature of which is controllable by the usual thermostat. The series of rods 116 are secured to the bar 112 and have threads 118 at their free upper ends. The rods 116 pass through bosses 120 secured to the frame 100 and locknuts 122 are adjustably mounted on the threads 118.

The bosses 120 are pivoted to the frame 100 at pivot points 121. In very long units of from three to twenty-four feet the cumulative thermal expansion is complete. The pivots 121 allow this expansion to occur without strain. A very slight gap between the consecutive bars 112 allows for the individual expansion of each bar.

The units just described are made up for sealing lengths of 12 inches. It is possible, by placing the units side-by-side and utilizing a common bar 126, to connect the several bars 112 and thus to have a unitary sealing device of any desired length all under a single control of the type shown in Figures 1, 2 and 3 and a similar connecting strip 128 in the lower jaw 124. The actual bearing surface of the lower jaw is made up of parallel strips 130 formed of silicone rubber. When the machine is extended these strips are arranged as shown in elements 130—134 in Figure 6. Springs 140, of course, are used to restore the pistons 104 to their upper position upon de-energizing of a solenoid.

It has been found that for the operation of extremely long units a single control box such as 10 may be used but for every three units there should be an individual solenoid-operated valve 30, all of these to be energized from a single timer 42 in the one control box 10. Such an arrangement is illustrated in Figure 7 in which a single solenoid-operated valve feeds a line 152 which branches out and supplies the cylinder of three 2-cylinder units 150, 150' and 150". In the line 152 before it branches out to the several cylinders is a line 156 running to a dump valve 154.

The dump valve 154 is a conventional item available on the open market, for which reason it is not described in detail here. Its function is to close whenever line pressure is developed in the line 152 and consequently in the line 156. When this pressure drops, however, upon de-energizing of the solenoid of valve 30 the dump valve opens, permitting an extremely rapid rate of the pistons in their several cylinders.

For extreme portability a unit such as is shown in Figure 8 is used. This unit comprises a C-frame 200 with a fixed jaw 202, a movable jaw 204 and a heating element 206 in the movable jaw. The temperature of the heating element 206 is controlled by a thermostat having a calibrated control knob 208. The movable jaw is operated by a piston and cylinder combination 210 and a handle 212 is secured at one end to the C-frame 200 and at the other end to the cylinder 210. A trigger-type switch 214 corresponds either to switch 52 or 54 of Figure 2 and serves to energize the timer 42 and consequently the solenoid 32.

It will be clear from the foregoing that a single control system has been provided by means of which a heat sealing cycle can be predetermined and invariably reproduced whether in an extremely small portable unit or in a very large fixed unit. It will further be clear that this arrangement provides for equalization of temperature throughout an elongated unit and that the problems of expansion incident to extreme length have been met.

I claim:

1. In combination: a pair of jaws and means for heating at least one of them; fluid pressure means for pressing said jaws together; a fluid pressure line; a valve for connecting said fluid pressure means to said line, said valve being normally biased to disconnecting position; a solenoid for shifting said valve to connecting position; a switch for energizing said solenoid and a timer in circuit with said switch and said solenoid for deenergizing said solenoid after lapse of a predetermined time.

2. The combination set forth in claim 1 including means responsive to reopening said switch and completion of the timing for resetting the timer for a subsequent operation.

3. The combination set forth in claim 1 including at least one additional switch operative in parallel with said first named switch.

4. The combination set forth in claim 1 including a flexible connection between said switch and said timer and a flexible connection between said valve and said fluid pressure means.

5. The combination set forth in claim 1 including a settable connection in said timer for causing automatic repetition of the cycle.

6. In a heat sealing unit: a fixed jaw; a movable jaw; a piston and cylinder for pressing said movable jaw against the fixed jaw; resilient means biasing said movable jaw to retracted position; and a connection between said piston and said movable jaw including contact between a plane surface and a curved surface whereby to accommodate variations in alinement between the two jaws.

7. A heat sealing machine comprising a plurality of alined frames, each containing a fixed jaw and a movable jaw; a unitary, common member extending through and joining the jaws of each of said sets of jaws; fluid pressure means in each of said frames to actuate said movable jaws and a single means for actuating simultaneously all of said hydraulic means.

HOWARD A. ROHDIN.

References Cited in the file of this patent

UNITED STATES PATENTS

| Number | Name | Date |
| --- | --- | --- |
| 2,343,975 | Hosfield | Mar. 14, 1944 |
| 2,405,675 | Southwick | Aug. 13, 1946 |
| 2,581,977 | Spalding et al. | Jan. 8, 1952 |
| 2,584,815 | Salfisberg | Feb. 5, 1952 |